United States Patent
Donohue et al.

(10) Patent No.: US 9,596,577 B1
(45) Date of Patent: Mar. 14, 2017

(54) RELAYING MOBILE COMMUNICATIONS

(71) Applicant: WhatsApp Inc., Santa Clara, CA (US)

(72) Inventors: Michael Donohue, Santa Clara, CA (US); Bryan D. O'Connor, Santa Clara, CA (US); Jan Koum, Santa Clara, CA (US)

(73) Assignee: WHATSAPP INC., Santa Clara, CA (US)

( * ) Notice: Subject to any disclaimer, the term of this patent is extended or adjusted under 35 U.S.C. 154(b) by 0 days.

(21) Appl. No.: 13/890,122

(22) Filed: May 8, 2013

(51) Int. Cl.
H04W 4/00 (2009.01)
H04W 4/12 (2009.01)

(52) U.S. Cl.
CPC .................................... *H04W 4/12* (2013.01)

(58) Field of Classification Search
CPC ........ H04W 4/14; H04W 4/12; H04L 12/5895
USPC ................. 455/466, 7, 13.1, 414.2
See application file for complete search history.

(56) References Cited

U.S. PATENT DOCUMENTS

| | | | |
|---|---|---|---|
| 2002/0165000 A1* | 11/2002 | Fok | H04L 12/581 455/466 |
| 2003/0095540 A1* | 5/2003 | Mulligan et al. | 370/352 |
| 2007/0275696 A1* | 11/2007 | Cheng et al. | 455/412.1 |
| 2008/0008170 A1* | 1/2008 | Yoshimi et al. | 370/389 |
| 2009/0149162 A1* | 6/2009 | Tenny | 455/414.1 |
| 2010/0177672 A1* | 7/2010 | Dayal et al. | 370/311 |
| 2012/0254390 A1* | 10/2012 | Choi et al. | 709/223 |
| 2013/0017829 A1* | 1/2013 | Kim | H04W 60/06 455/435.1 |
| 2013/0117392 A1* | 5/2013 | Aceves | 709/206 |

* cited by examiner

*Primary Examiner* — Nghi H Ly

(57) ABSTRACT

A system, method and apparatus for relaying mobile communications is provided. The system hosts a communication application operated by mobile communication devices. When a communication is received for a user of a destination device that is off-line, the system determines whether the destination device is capable of receiving an unsolicited message (e.g., a push message, a peer-to-peer message). The system then selects a different mobile device capable of sending a peer-to-peer relay message to the destination device. A relay request is transmitted to the selected device, which causes it to generate and transmit toward the destination device a relay message that will cause the destination device to connect to the system. Either or both of the relay device and the destination device may delete the messages it sends and/or receives during this process, before a user of the device opens the message(s).

13 Claims, 3 Drawing Sheets

RELAYING MOBILE COMMUNICATIONS

BACKGROUND

This invention relates to the field of communications. More particularly, systems, methods and apparatus are provided for relaying communications between mobile communication devices.

Many applications that operate on mobile telephones and/or other mobile communication/computing platforms feature or may even require regular interaction with a server-based component. For example, a communication application that allows a user to exchange text messages, images, video, audio and/or other media with other users require a connection with the server in order to receive and send communications. However, mobile applications usually do not or cannot maintain continuous connections with server components.

SUMMARY

In some embodiments of the invention, a system, method and apparatus are provided for relaying a message to one user's mobile device via another user's device. In these embodiments, a server or originating user has a communication to deliver to a destination user as part of a communication application. The communication may contain content for consumption by that user (e.g., a text message, a photo), may include a notification or instructions for the destination user's device, or may have some other purpose. The communication application is centralized, meaning that a communication from one user destined for another is first sent to the server, and the server delivers it or forwards it to the destination user.

If the server cannot send a communication directly to the destination user, perhaps because the application is off-line on the destination user's device (e.g., it is not executing as the active application), the server relays an alert message regarding the communication (or, alternatively, the communication itself) through another user. For example, the alert message may be delivered to a device operated by an intermediate or relay user, and will be understood by the application (which is executing on the relay user's device) as a request to notify the destination user's device that a communication awaits him or her. The destination user's device (e.g., a client version of the communication application operating on the device) will then connect to a server component to retrieve the communication.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a message destined for a specific user or a specific communication device or computing device (e.g., a mobile telephone, a portable computer) is relayed to that destination user or device via an intermediate user or device. In these embodiments, the destination may be currently unreachable by the originator of the message because the destination user's device is off-line or powered off, a corresponding application is off-line on the device, or for some other reason. The originator may be another user, a service provider—such as a provider of communication services or an application—or some other entity.

In these embodiments, a message that is delivered to a destination user's device via an intermediate device is referred to as a "relay message," and the message that is dispatched to an intermediate device to cause it to send a relay message to a destination device is referred to as a "relay request" or a "relay request message."

In some implementations, a relay message is a wake-up message intended to activate a particular application on the destination device and have it connect to a server component or other central system in order to receive a communication addressed to the destination user. In other implementations, the relay message may be the communication itself or some other type of alert.

Thus, a relay message delivered to a destination user may or may not contain user-readable content (e.g., a textual message) but, however it is formatted, the destination device (e.g., an operating system of the device) will understand what to do with the message, and the target application will recognize it and take appropriate action (e.g., connect to an application server). In particular, application logic residing on the destination user's device and the intermediate/relay user's device will recognize a relay message and take appropriate action as discussed below.

In some embodiments of the invention, destination users benefit from a scheme for relayed communication provided herein by conserving power on their mobile devices. By maintaining an ability to receive alerts (i.e., via relay messages), a destination device can hibernate or go offline to save battery power, without losing all communication. Thus, the destination device may functionally appear to be "always connected" to the central communication application, but without the power expenditure that would normally entail.

Figure 1:
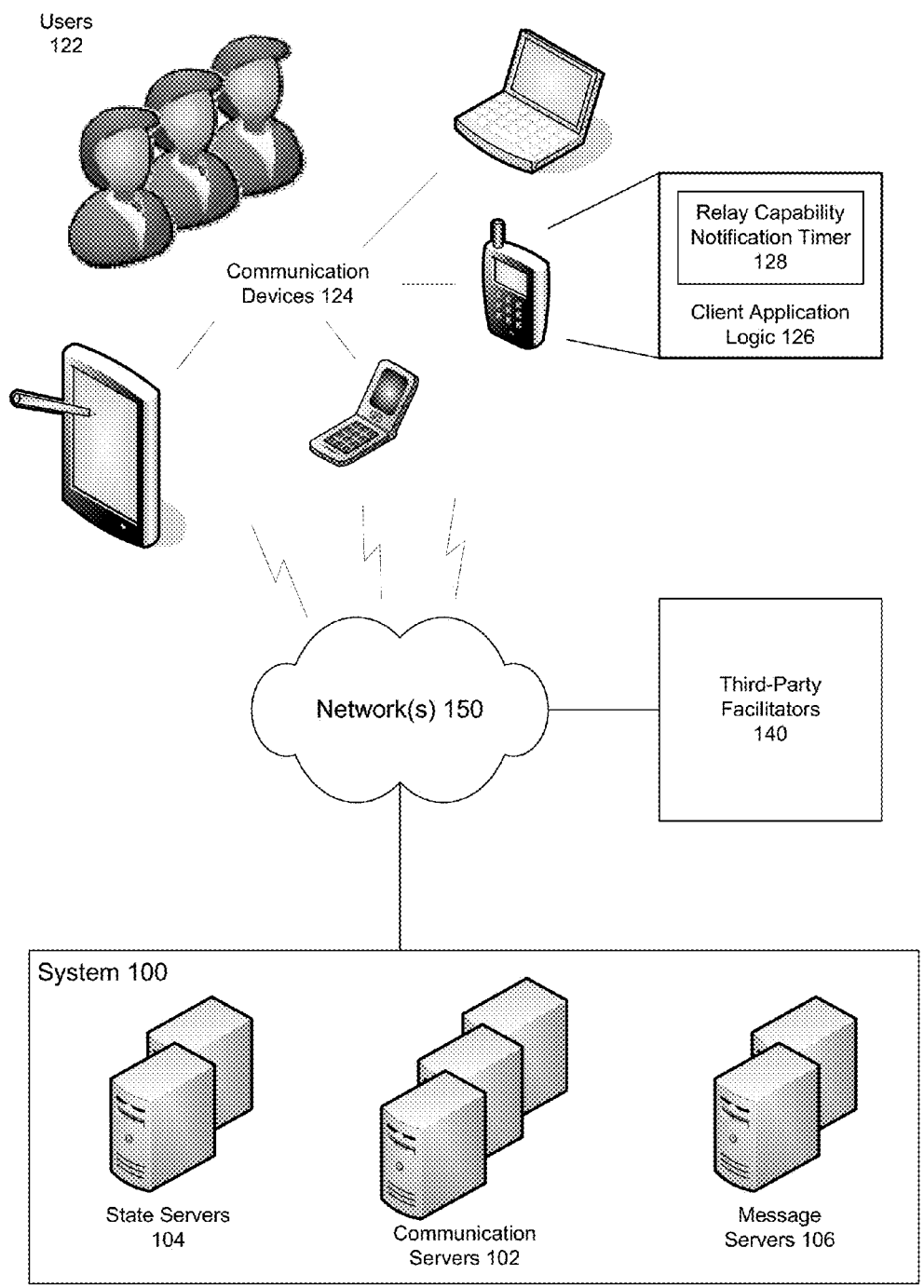
FIG. 1 is a block diagram depicting a communication environment in which some embodiments of the invention may be implemented.

FIG. 1 is a diagram of a communication environment in which some embodiments of the invention may be implemented. In these embodiments, users 122 operate any of a variety of communication devices 124. Devices 124 may include smart phones running virtually any modern operating system (e.g., Android, BlackBerry, iOS, Nokia S40, Symbian, Windows Phone), tablet computers, other mobile computers, workstations, etc. In general, these devices are capable of voice and/or data communications.

System 100 is a data center, computer network or other amalgamation of computer resources for hosting a communication application or service used by multiple users (e.g., users 122). In some implementations, the application provides a user with instant messaging of text, audio, photos, video and/or multimedia from his or her communication device (e.g., a device 124), with one or more other users. In other implementations, the application may promote document-sharing, social networking or some other activity that involves user-to-user communications.

The application is compatible with all of devices 124, and includes client application logic that is executed under the devices' native operating systems—such as client application logic 126. With the application, a user operating one type of device and subscribing to one communication service provider can exchange messages with users operating other types of devices and subscribing to other communication service providers. Individual messages may be sent by one user (or system 100) to any number of recipients, and a group form of communication (e.g., group chat) may be offered in which multiple users interactively exchange instant messages and/or media content.

Client application logic 126 for some or all devices 124 includes relay capability timer 128. Timer logic 128 is configured to cause the device 124 to periodically send a signal to system 100 (e.g., a communication server 102) to inform the system of a status of the device and/or the application logic. In particular, the timer logic may serve to indicate that the device is (or is not) capable or available to relay a message to another device 124, and/or to receive a relayed message.

With this information, system 100 will be able to track the ability of user devices to receive relay request messages and/or relay messages as discussed herein, and/or to issue a relay message to another user's device. Illustratively, a device may report that it is relay-capable if (and only if) application logic 126 is installed, the device is configured to receive unsolicited notifications (e.g., a device user has not turned off the ability to receive push notifications) and the device is capable of sending/receiving peer-to-peer messages.

In some implementations, a peer-to-peer message format used to send a relay message from one client device to another comprises or is a form of PIN messaging available to users of some devices.

Communication servers 102 of system 100 are front-end components that host users' connections with the system and that facilitate the exchange of communications between users. Servers 102 may be referred to as "chat" servers, in that they receive instant messages and chat session communications from individual users for delivery to one or more other users.

Illustratively, as long as a user is on-line with system 100 and the communication application hosted by system 100 is executing (e.g., in the foreground of the user's device), a connection or session may be maintained between the user's device and a communication server 102. When the application is no longer running as the primary or foreground application, the device's connection with system 100 may persist for some period of time (e.g., five minutes, fifteen minutes), or may persist until the application is actually closed or terminated (or some period of time after it is closed).

State servers 104 maintain states or statuses of users and/or user devices. Thus, a state server stores some or all of a user's profile, including applicable preferences (e.g., preferred audible and/or visual alert), device type/model, etc. State servers 104 also identify users' telephone service providers and store information necessary for pushing messages to a user's device where necessary, such as a device token needed to communicate with the device via the applicable third-party. This device token may also or alternatively be known as a "device URI (Uniform Resource Identifier)," a "registration id," a "PIN" (Personal Identification Number) or may have some other moniker. The token may be unique to a particular device or a particular user.

Message servers 106 store communications that cannot immediately be delivered to their target or destination users. A new communication received for a user who is currently on-line with system 100 can be delivered immediately (i.e., through the user's open connection with a communication server 102). A communication received for a user who is currently off-line (e.g., a user who does not have an open connection with a communication server 102) may be stored on a message server 106 until it can be delivered. As discussed elsewhere, system 100 may attempt to deliver or send a wake-up message or other alert to such a user's device in order to prompt it to connect to the system and receive the communication.

Other components of system 100 are omitted from FIG. 1 for the sake of clarity. For example, the system may include other entities for registering new users, storing users' contacts (e.g., address books), synchronizing a user's contacts among multiple devices and/or with other users, converting content (e.g., a video, a photograph) from one form or format to another, monitoring communications for undesirable content (e.g., spam, malware, pornography), and so on.

Information identifying termination points of on-line users' connections with system 100 (e.g., which communication server is hosting the users' connections) may be stored on communication servers 102, state servers 104 and/or other entities, such as a session server (not depicted in FIG. 1). For example, each communication server may maintain a table or other data structure identifying users whose connections with the system are terminated at or hosted by that server. Another entity (e.g., a state server 104, a session server) may store a larger dataset that identifies, for every user connected to the system, which communication server maintains their connection.

Thus, when a communication server receives a new communication from a connected user, for one or more other users, it may perform a lookup within local data and/or data stored on another system entity in order to find out if the other users are connected and, if so, where. In some implementations, it will first search a local data table (e.g., a routing table on the communication server that received the message), and only issue a query to another component if some or all destination users' statuses are not found locally.

Any number (e.g., one or more) of communication servers, state servers, message servers, session servers and/or other servers may be deployed within system 100. The functions of servers 102, 104, 106 may be distributed differently in other embodiments, such as by being merged into fewer computer resources or divided among additional resources.

The servers of system 100 may be separate physical computers comprising distinct hardware resources (e.g., processor, storage, communication interface) and software resources (e.g., program code, data) suitable for performing the functions ascribed to them. In some alternative embodiments, servers 102, 104, 106 may be virtual computing machines that share hardware and/or software resources. Thus, multiple software server modules performing different functions may reside on one computing machine.

As discussed above, a communication destined for a user or a user device can be immediately transmitted to the destination user or device if the user/device has an open connection with system 100. But, when system 100 possesses a communication for a user/device that is off-line, the communication may be stored until it can be delivered. To provide timely delivery of user communications, when a destination user of a communication is off-line, the system may attempt to "wake-up" the user's device and activate the corresponding application logic (e.g., client application logic 126).

For some device platforms (e.g., Android), system 100 is able to send a wake-up message directly to a destination user's device. The message will be understood by the device's operating system, which will alert the corresponding application logic. The message will cause the application to begin executing (or to operate in the foreground if executing in the background) and accept the message, which will cause it to establish a connection with system 100. However, for some device platforms (e.g., iOS, Windows Phone), system 100 cannot directly send wake-up messages to off-line devices. Alert messages to these devices may be handled in some cases by third parties.

In embodiments of the invention depicted in FIG. 1, third-party facilitators 140 include communication service providers, manufacturers and/or device providers that can forward wake-up messages from system 100 to such communication devices. For example, system 100 may issue a message to the third-party facilitator providing service for a particular user's device, and that facilitator can send a wake-up message to the device.

However, in some situations, a third-party facilitator will not be able to, or will refuse to, deliver an alert message to a destination device. For example, a facilitator's push capability may be off-line or the facilitator may limit a quantity of alert messages that it will deliver, whether to a specific user device, on behalf of a particular application, on behalf of a given service/application provider (e.g., system 100), or on some other grounds. Thus, by relaying an alert message to a destination device via an intermediate device, system 100 can wake-up or notify the destination device regardless of whether or not a wake-up message could have been sent through the device's service provider or facilitator.

Network(s) 150 comprise communication paths between devices 124, system 100 and third-party facilitators 140, and may include data and/or voice communication channels. For carrying data communications, networks 150 may comprise the Internet, one or more intranets, LANs (Local Area Networks), WANs (Wide Area Networks) and/or other point-to-point or distributed connections, which may be wired and/or wireless. For carrying voice communications, network(s) 150 may comprise wired and/or wireless voice communication links managed by one or more telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO) and so on.

Networks 150 may thus comprise various entities not shown in FIG. 1, such as routers, gateways, switches, base stations (e.g., wireless access points, Node Bs, Evolved Node Bs) and/or other equipment for establishing, maintaining, switching or otherwise manipulating a data and/or voice connection.

In some embodiments of the invention, a relay request message and a resulting relay message may propagate differently through networks 150 and/or other communication paths. For example, system 100 may dispatch a relay request message to a first client device 124 through a connection with system 100 established by the device's application logic 126. The resulting relay message from the first client device 124 to another client device may be issued as a peer-to-peer communication that bypasses system 100. The relay message may transit communication networks and equipment of the service providers of the two client devices, but even though it is originated by an application hosted by system 100, it need not transit the system. The relay message can be generated, sent, received, acknowledged and/or otherwise processed by the client devices' application logic, without action by a communication server 102 or other system component.

Figure 2:
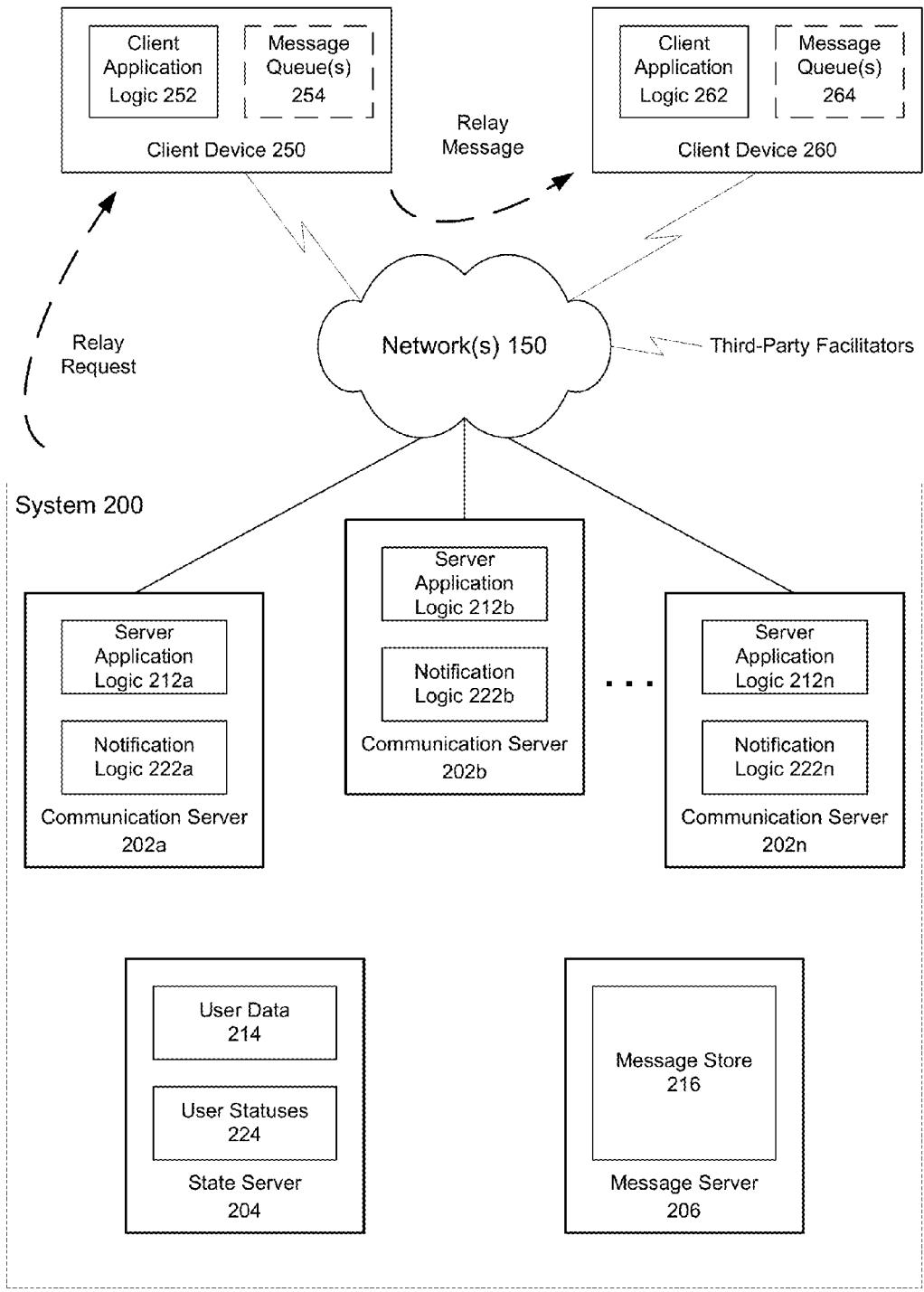
FIG. 2 is a block diagram of a system for relaying messages, in accordance with some embodiments of the invention.

FIG. 2 is a block diagram of a system and an apparatus for relaying a message to a destination user device via an intermediate device, according to some embodiments of the invention.

In these embodiments, multiple client devices (e.g., devices 250, 260) operate a common communication application that includes client application logic 252, 262. Client devices 250, 260 may be of the same type or of different types of device platforms. Thus, client application logic 252, 262, while configured to operate the same application, may necessarily differ as required in order to operate with their devices' corresponding operating systems. Each device may have a message queue (queues 254, 264) for storing communications, which may be part of application logic 262 or may be separate.

System 200 includes one or more of each of communication server 202 (e.g., servers 202a through 202n), state server 204 and message server 206. Each communication server 202 hosts a server version or counterpart 212 of the client application logic operated by users of client devices 250, 260, and also includes notification logic 222. Server application logic 212 operates in conjunction with client application logic 252, 262 to facilitate the exchange of communications and content between users. Logic 222 initiates relay request messages, wake-up messages and/or other notifications to devices, to notify them of new communications addressed to users of those devices and/or for other purposes.

Logic 222 is configured to retrieve data (e.g., from a state server 204) for initiating notification to a client device that is off-line from system 200 that a communication has been received for a user of the device. As discussed above, such a notification may take the form of a wake-up message sent via a third-party facilitator, or may entail issuance of a relay request message to an on-line client device to have that device send a relay message to the destination client device. A notification, if it regards a communication from an on-line user, may include one or more addresses/ports and/or other indicia identifying a communication server 202 (or other system component) the destination device should connect to when it comes on-line with the system. The wake-up message or relay message may also include a portion of the communication, instructions to the device regarding an audible sound to make, content to display, a physical sensation to initiate (e.g., vibration) and/or other information.

In some embodiments of the invention, client application logic 252, 262 registers a listener with the host device operating system to receive notifications of all new incoming and outgoing messages, including relay messages. The application logic ignores notifications of messages that are not related to a relay scheme described herein, as determined by a message's subject, originator, destination and/or other characteristics. In these embodiments, relay messages carry one or more predetermined attributes, such as the message subject, which allows a device's application logic to quickly recognize a relay message.

In these embodiments, the application logic may be programmed to ignore outgoing messages having the predetermined attribute(s). Otherwise, the relay device may attempt to delete the relay message before it is sent.

State server 204 includes user data 214 and user statuses 224. In these embodiments of the invention, user data 214 includes information that allows system 200 to send (e.g., "push") a message to a client device of a user of system 200. A given user's data may include information about his or her device, such as type/model, telephone number, service provider, network address (e.g., IP or Internet Protocol address) and a device token or PIN issued by a manufacturer or provider of the device, which allows system 200 to push a message to the device. A user's data may also include one or more user preferences (e.g., preferred notification tone or sound, preferred notification format), profile information, etc.

User statuses 224 indicate whether a given user is on-line or off-line with regard to system 200 and, if on-line, identify which communication server 202 the user is connected to. A user may be considered on-line if client application logic 252, 262 is executing on his or her device and the device has an open connection with system 200; otherwise, he or she may be considered off-line.

User statuses 224 also indicate which client devices are capable of receiving relay messages from another client device, and capable of issuing a relay message in response to a relay request message from system 200. In some implementations, user statuses 224 comprise a first database, table or other data construct that identifies information regarding how to push a message to any user of the application. A second data construct may be used to identify devices that are capable of receiving relay request messages and sending/receiving relay messages—this may be termed a "relay-capable" collection of data. This data may be assembled and maintained on the basis of periodic status reports received from client devices (e.g., relay capability notification timer logic 128 of FIG. 1). A third data construct may be maintained to identify those relay-capable devices that are currently on-line with system 200.

Some or all of these data collections reside within state server 204. In other implementations, user statuses, relay capabilities, connection statuses, termination points of users' connections and/or other data used in the creation or dissemination of relay messages are stored on different system components. However, when a communication server receives a communication for an off-line user, it can quickly determine whether that user's device can receive a relay message and, if so, rapidly identify an on-line client device that can receive a relay request message and send a relay message to the destination device. Alternatively, the communication server may initiate a wake-up message via the appropriate third-party facilitator.

In some embodiments of the invention in which system 200 comprises multiple state servers, the state servers share data. In these embodiments, data indicating how to contact a user (or a user's device) is replicated across all state servers, thereby allowing any of them to answer a query from a communication server regarding how to communicate with a given device or a given user's device. The replicated data thus includes the user's device type/model, service provider, device token, network address and/or other information the system may need in order to contact a device (e.g., to wake it up) directly, through a third-party facilitator or via an intermediate client device.

Message server 206 includes message store 216 for storing messages for off-line users. As the users come on-line and connect to a communication server, their messages are retrieved from storage and delivered to the users.

In some embodiments of the invention, components of system 200 are interconnected via a mesh network, so that each component can communicate directly with another. In some alternative embodiments of the invention, other internal communication links may be employed within system 200, such as an Ethernet-type local area network or intranet.

In some embodiments of the invention, to support simultaneous interaction of communication servers 202 with client devices and communications among system components, communication servers 202 include at least two communication interfaces. A first interface (e.g., a public interface) is exposed for user connections, while a second interface (e.g., a private interface) is reserved for communications within system 200.

In addition, in some embodiments, a communication server may be able to host secure communications using SSL (Secure Sockets Layer), TLS (Transport Layer Security) or some other secure communication protocol or security scheme, in addition to non-secure protocols. When a communication server issues a notification to an off-line user's communication device, it may include addresses (e.g., including port numbers) for establishing secure and/or non-secure communication connections. When it receives such a notification, the device may connect to one or the other, depending on whether it is configured to support secure connections, whether the user has expressed a preference for one over the other, etc.

Figure 3:
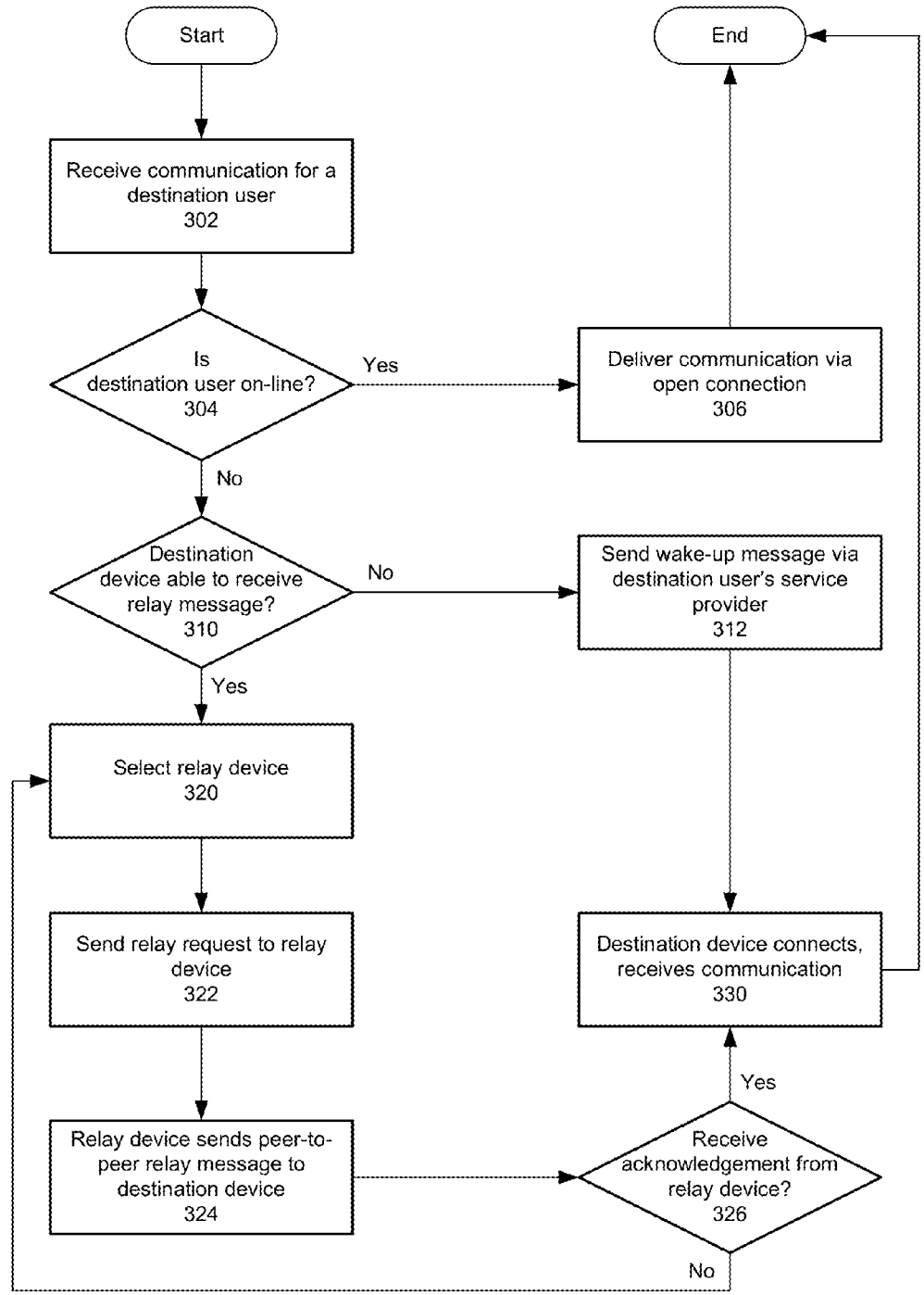
FIG. 3 is a flow chart of a method of relaying a message to a destination user via an intermediate user, according to some embodiments of the invention.

FIG. 3 is a flow chart demonstrating a method of relaying a message to a destination user device via an intermediate user device, according to some embodiments of the invention.

In these embodiments, a system such as system 100 of FIG. 1 or system 200 of FIG. 2 hosts an application enjoyed by users of multiple mobile communication/computing devices and performs the illustrated operations. Some or all of those devices regularly report to the system regarding their capability of handling push messages and/or peer-to-peer messages (e.g., every 8 hours, every 12 hours, once per day). A push message may be described as an unsolicited message sent from one entity to another, and may or may not be a peer-to-peer message. A peer-to-peer message may be described as a message sent from one client device or one instance of a client application to another device or application instance.

In operation 302, the system (e.g., a communication server) receives a communication from one user's computing or communication device, which is addressed to a destination user. Depending on the application, users may be identified by usernames, electronic mail addresses, telephone numbers and/or other indicia. The communication may be addressed to multiple users, but the method of FIG. 3 is described as applied for one addressee; the method may be repeated or performed in parallel for each of multiple addressees.

In operation 304, the system determines whether the destination user or destination device is on-line. This may entail examination of a routing table, review of status information reflecting users' and/or devices' statuses, etc. If the user is on-line, the method continues with operation 306; otherwise, the method advances to operation 310.

In operation 306, the communication is delivered to the destination user/device via the device's open connection with the system. The method then ends.

In operation 310, the destination device is off-line and so the communication is stored in a message server, a communication repository or some other system component. The system (e.g., the communication server, a status server queried by the communication server) then determines whether the destination user/device is able to receive a relay message. The system may determine whether the destination device can receive unsolicited messages in general, which might include push messages from the system hosting the communication application, but it will specifically determine whether the destination device can receive peer-to-peer messages from another user's device. In some environments, the destination user may only be able to receive peer-to-peer messages from other users having the same service provider or device platform; in other environments this limitation may not exist.

Operation 310 may involve review of stored data regarding the destination user/device. As described above, in some embodiments the system stores user-related information such as a device type, device token, communication service provider, global user identification, and may also store relevant device configuration details such as its time-out period, identities of compatible communication protocols, whether certain features (e.g., peer-to-peer messaging, encryption) are enabled, and so on. If, for example, the system possesses no token or PIN for the destination device, it cannot initiate an unsolicited message to that device or request some other entity to send such a message, regardless of the destination device's ability to receive a relay message; in this case the illustrated method may end with the communication awaiting the destination user; alternatively, and as described below, the method may proceed to operation 312.

Operation 310 may also involve review of the status information periodically received from some or all users' devices that reports their ability to send and/or receive unsolicited messages. Illustratively, information received from the destination user's device may explicitly indicate its capabilities or limitations or, if no information is received for a period of time (e.g., 8 hours, 12 hours, one day), it may be assumed that the device cannot receive and/or cannot send relay messages, peer-to-peer messages and unsolicited messages in general.

If the destination device is deemed unable to receive push messages and/or peer-to-peer messages, the method may continue at operation 312; otherwise, the method advances to operation 320.

In operation 312, the system issues a request to the appropriate third-party facilitator (e.g., a corresponding service provider) to send a wake-up message or alert to the destination device. Assuming this is successful, the method advances to operation 330. If unsuccessful, the system may re-try operation 312 or end the illustrated method and deliver the communication the next time the user connects to the system.

In operation 320, the system (e.g., the communication server, a status server) selects a relay device from a collection or pool of client devices that operate the application, that reported being capable of initiating unsolicited peer-to-peer messages and that are currently connected to the system. It may be necessary to select a device that is specifically capable of sending messages to the destination user, based on the destination device platform, the destination user's communication service provider and/or other information.

In operation 322, the system (e.g., a communication server) transmits a relay request to the selected relay device. The relay request is formatted according to a protocol employed by the communication application, and will be understood by the relay device (i.e., by the application operating on the device) as a request to initiate a peer-to-peer message or some other form of unsolicited message to the destination device.

The relay request includes information needed by the relay device to identify the destination device and to send a relay message to it (e.g., telephone number, network address, user id, device PIN or token, reason for sending the message). The relay request may include information to pass on to the destination device as part of the relay message, such as a reason for the message (e.g., a pending communication for the destination user), an address of a system component to connect to, a portion of the pending communication (e.g., subject, sender, a snippet of its content), etc.

In these embodiments of the invention, the relay request is sent via the relay device's open connection with the system, and may require forwarding the request from one communication server (i.e., the one that received the communication for the destination user) to another (i.e., the one having an open connection with the relay device). Because the relay device is executing the application (i.e., client application logic), the application will quickly receive the relay request and readily identify it as such.

In operation 324, the application logic on the relay device creates and sends the requested peer-to-peer relay message toward the destination device, using a communication utility provided for such purpose within the device's operating system, communication software provided by the device's service provider, the application itself or some other logic. The relay message may be sent directly to the destination device (e.g., if it is within range), or may traverse communication networks of the service providers of the relay device and/or destination device. Either a service provider or an application for peer-to-peer messaging may wake-up the destination device if it is off-line.

In some embodiments of the invention, client application logic on the relay device monitors the progress of the creation and transmission of the relay message, and deletes the relay request message (e.g., from a message repository of the application) and the relay message (e.g., from a message repository of the peer-to-peer communication utility) when appropriate. For example, as soon as the application determines that the relay message has been transmitted, it may delete both messages. As another example, it may delete the relay request message as soon as it initiates the relay message, and delete the relay message after it is sent.

In other embodiments of the invention, the relay request message from the system to the relay device is formatted as a protocol message (e.g., according to a protocol used by the communication application) or some other type of ephemeral message, and is therefore automatically discarded upon consumption. As indicated in the following operation, the communication application logic executing on the relay device may send a message to the system to indicate the success (or failure) of sending the relay message.

In operation 326, the system determines whether it receives a notification of success from the relay device. If it receives such a notification, which means that the relay device was able to send a relay message to the destination device, the method advances to operation 330. Otherwise, the method may return to operation 320 to select a different relay device and send another relay request, may skip to operation 312 to send a wake-up message via the appropriate facilitator, or may stop trying to alert the destination user.

In operation 330, after the destination device receives a wake-up message from a facilitator (e.g., from operation 312) or a peer-to-peer relay message (from operation 324), the communication logic on the device will execute and connect to the system. After the device connects, the system will deliver the waiting communication. The illustrated method then ends.

As discussed above, in the method of the invention illustrated in FIG. 3 the incoming relay request message and outgoing relay message were purged from the relay device. Similarly, the relay message received by the destination user may be purged from the destination device. On both devices (i.e., the relay device and the destination device), client communication application logic strives to remove the messages as soon as possible. For example, as soon as the application logic understands the incoming relay request or relay message it may delete it.

However, in some embodiments of the invention, either or both of the relay request message and the relay message may contain human-readable content (e.g., a message body) that may provide an innocuous explanation for the message. Therefore, in the event a user observes the message before the client application logic can delete it, some explanation for the message is provided.

In other embodiments, the messages do not contain human-readable content. In general, however, the messages are configured for consumption by devices' client communication application logic. The application logic will act upon the message it receives and delete the message, in most cases before a user of the device can determine that a message has been received.

In some embodiments of the invention, use of relay messaging may depend on the communication environment. For example, if a particular platform supports peer-to-peer messaging, but the messaging prevents the communication application from observing or processing a peer-to-peer message, relay messaging may be avoided for that platform's devices. As another example, if use of an intermediate user's device as a relay device would offend users in some country or region, relay messaging may be suppressed there. Contrarily, if a particular third-party facilitator resists or refuses to deliver wake-up messages to destination users' devices, relay messaging for destination users associated with that facilitator may increase.

The environment in which some embodiments of the invention are executed may incorporate a general-purpose computer and/or a special-purpose device such as a handheld computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method comprising:
receiving, at a computer system hosting a communication application, a communication addressed to a user of a destination mobile device;
determining, at the computer system, whether the destination mobile device is off-line, the determining comprising evaluating whether the communication application is an active application on the destination mobile device by consulting a state server with which the destination mobile device registers when the communication application is active;
selecting a relay mobile device, other than the destination mobile device, capable of sending a peer-to-peer message; and
transmitting a relay request to the selected relay mobile device, in response to which the relay mobile device transmits a peer-to-peer relay message to the destination mobile device.

2. The method of claim 1, further comprising:
receiving at the computer system a connection from the destination mobile device, initiated in response to the relay message.

3. The method of claim 1, further comprising:
receiving from multiple mobile devices, including the relay mobile device, periodic capability notifications identifying the devices' capabilities regarding unsolicited messages.

4. The method of claim 3, wherein a capability notification identifies a device's capability of receiving a push message.

5. The method of claim 3, wherein a capability notification identifies a device's capability of receiving a peer-to-peer message.

6. The method of claim 3, wherein a capability notification identifies a device's capability of sending a peer-to-peer message.

7. The method of claim 3, wherein selecting a relay mobile device comprises identifying one of the multiple mobile devices having an open communication connection with the system.

8. The method of claim 1, further comprising:
prior to said selecting, determining how many push messages have been transmitted to mobile devices via a service provider of the destination mobile device;
wherein the service provider limits a number of push messages it will transmit on behalf of the system.

9. The method of claim 1, further comprising:
if the system does not receive from the selected relay mobile device a notification of transmission of the relay message, transmitting a request to a service provider of the destination mobile device to send an alert message to the destination mobile device.

10. The method of claim 1, further comprising:
if the system does not receive from the selected relay mobile device a notification of transmission of the relay message, selecting a different relay mobile device and transmitting the relay request to the different relay mobile device.

11. The method of claim 1, wherein:
the relay mobile device deletes the received relay request and the transmitted relay message before a user of the relay mobile device opens either message.

12. The method of claim 1, wherein:
the destination mobile device deletes the relay message before a user of the destination mobile device opens the relay message.

13. A non-transitory computer-readable medium storing instructions that, when executed by a processor, cause the processor to:
receive, at a computer system hosting a communication application, a communication addressed to a user of a destination mobile device;
determine, at the computer system, whether the destination mobile device is off-line, the determining comprising evaluating whether the communication application is an active application on the destination mobile device by consulting a state server with which the destination mobile device registers when the communication application is active;
select a relay mobile device, other than the destination mobile device, capable of sending a peer-to-peer message; and
transmit a relay request to the selected relay mobile device, in response to which the relay mobile device transmits a peer-to-peer relay message to the destination mobile device.

* * * * *